US008051973B2

(12) United States Patent
Campioli et al.

(10) Patent No.: US 8,051,973 B2
(45) Date of Patent: Nov. 8, 2011

(54) DEVICE FOR TRANSFERRING AN OBJECT FROM A PRINTING MACHINE CHUCK TO A SUPPORT AND DISTANCING PIN

(75) Inventors: Milo Campioli, Reggio Emilia (IT); Vittorio Ferrari, Reggio Emilia (IT)

(73) Assignee: Decomac-Societa' a Responsabilita' Limitata, Reggio Emilia (IT)

( * ) Notice: Subject to any disclaimer, the term of this patent is extended or adjusted under 35 U.S.C. 154(b) by 609 days.

(21) Appl. No.: 12/278,197

(22) PCT Filed: Jan. 22, 2007

(86) PCT No.: PCT/EP2007/050598

§ 371 (c)(1), (2), (4) Date: Aug. 4, 2008

(87) PCT Pub. No.: WO2007/090728

PCT Pub. Date: Aug. 16, 2007

(65) Prior Publication Data

US 2009/0067975 A1 Mar. 12, 2009

(30) Foreign Application Priority Data

Feb. 10, 2006 (IT) .............................. RE2006A0017

(51) Int. Cl.
*B41F 17/20* (2006.01)
*B65G 47/52* (2006.01)

(52) U.S. Cl. .................. 198/468.9; 198/346.2; 198/408; 198/468.01; 198/470.1

(58) Field of Classification Search ........................ None
See application file for complete search history.

(56) References Cited

U.S. PATENT DOCUMENTS 4,690,050 A * 9/1987 Rouly et al. .................... 101/35
6,584,895 B1 7/2003 Strauch et al.

FOREIGN PATENT DOCUMENTS

EP 1164010 A1 12/2001
IT 1069158 B 3/1985

* cited by examiner

*Primary Examiner* — Gene Crawford
*Assistant Examiner* — Yolanda Cumbess
(74) *Attorney, Agent, or Firm* — Browdy and Neimark, PLLC

(57) ABSTRACT

A device for transferring objects from a printing machine chuck to a support and distancing pin, the chuck and the pin being moved on two independent paths, at a point of which paths they are parallel to one another and at a predetermined reciprocal distance, the device comprising a carriage which is mobile in a parallel direction to the chuck and to the pin, between a distant position from the chuck and the pin to a close position to the chuck and the pin, means for gripping and releasing the objects being provided on the carriage, which means for gripping and releasing are mobile along a trajectory in a perpendicular plane to the carriage in order to be placed alternatively in front of the chuck and the pin, the trajectory including at least a tract in which it is parallel to the path of the pins.

8 Claims, 5 Drawing Sheets

DEVICE FOR TRANSFERRING AN OBJECT FROM A PRINTING MACHINE CHUCK TO A SUPPORT AND DISTANCING PIN

TECHNICAL FIELD

The invention relates in general to a printing machine for cylindrical objects located on a chuck and, more in particular, to a device for unloading printed objects from the machine.

BACKGROUND ART

As is known, printing machines of this type generally comprise means for moving which locate each single object to be printed in a succession of work stations, at which the object is subjected to the various stages of the printing process.

Normally these means for moving comprise a rotatable carousel provided with a circumferential series of angularly equidistanced chucks, each of which bears a respective object to be printed.

At the end of the printing stages, the rotatable carousel locates each printed object in an extractor station, in order for it to be removed from the carousel and possibly sent on to a warehouse or other process machine.

A transfer organ is operative at the extractor station, which transfer organ removes the printed object from the relative chuck of the rotatable carousel and transfers it to special means for distancing.

Obviously during this operation the carousel is stationary.

Normally the means for distancing comprise a plurality of pins which are moved in succession along a predetermined pathway which brings them to pass into the above-mentioned extractor station, where they pair up with the chucks of the rotatable carousel.

The transfer organ generally comprises a gripping element which can grip a printed object which is made available therefor by the rotatable carousel.

The transfer organ is therefore activated to move alternatingly straight, so as to complete a backward run, in which it extracts the printed object from the relative chuck, and a following forward run, in which it places the printed object on a pin which, in the meantime, has moved to a side of the chuck.

A drawback of these known machines is that the hourly production rates thereof are very considerably limited by the slowness of the above-described unloading stage of the printed objects, which forces the carousel to take lengthy rests.

It is easily understood that to unload each printed object two complete runs, backward and forward, of the transfer organ are required, while the carousel chuck and the pin are stationary in the extractor station: a first run to remove the object from the rotating carousel, and a second run to bring itself back into the unloading position and grip a new printed object, while the first object is transferred to the means for distancing.

DISCLOSURE OF INVENTION

The aim of the present invention is to make available an unloading device for a printing machine, which enables the printed objects to be transferred to the means for distancing more rapidly and efficiently than is the case with the prior art, thus obviating the above-mentioned drawback.

A further aim of the invention is to achieve the above-described aim with a simple, rational and inexpensive solution.

These aims are attained by the invention, in which a device for transferring objects from a printing machine chuck to a support and distancing pin, the chuck and the pin being moved on two independent paths, at a point of which paths they are parallel to one another and at a predetermined reciprocal distance, the device comprising a carriage which is mobile in a parallel direction to the chuck and to the pin, between a distant position from the chuck and the pin to a close position to the chuck and the pin, means for gripping and releasing the objects being provided on the carriage, which means for gripping and releasing are mobile along a predetermined trajectory in order to be placed alternatively in front of the chuck and the pin, wherein projections of the trajectory and of the path of the pins, in a perpendicular plane to a movement direction (A) of the carriage, coincide along at least a tract thereof.

The dependent claims delineate preferred and particularly advantageous embodiments of the invention.

BRIEF DESCRIPTION OF THE DRAWINGS

Further characteristics and advantages of the invention will emerge from a reading of the following description, provided by way of non-limiting example, with the aid of the figures of the drawings, in which.

BEST MODE FOR CARRYING OUT THE INVENTION

Figure 1:
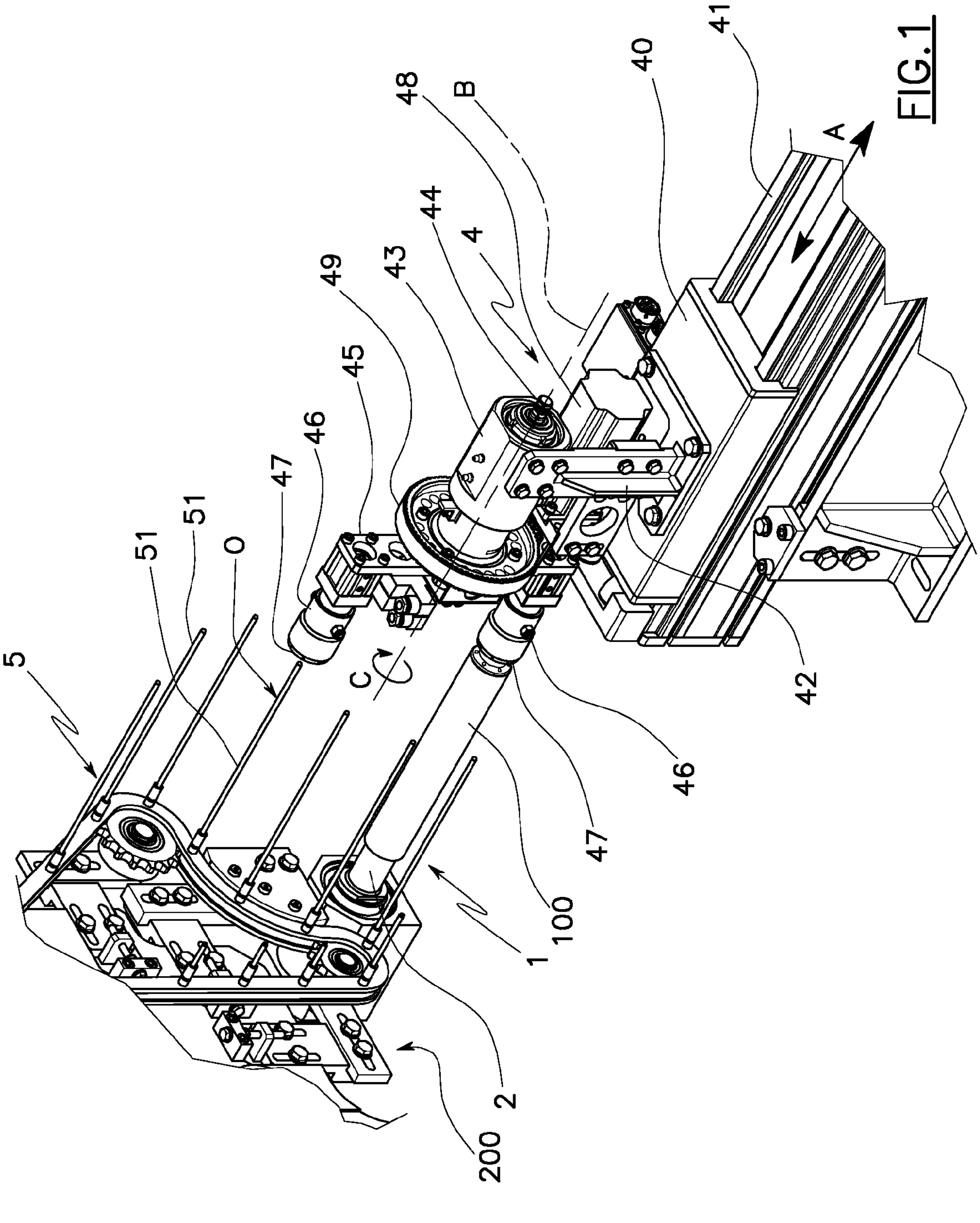
FIG. 1 is a perspective view of an unloading device according to the invention.

The figures illustrate a device for unloading for a screen printing machine, for printing on a lateral surface of tubular objects 100 having a cylindrical shape. The printing machine comprises means for moving (not completely illustrated) which place each single object 100 to be printed in a succession of predetermined work stations, at which each single object 100 is subjected to the various stages of the printing process.

The means for moving preferably comprise a rotatable carousel 200 provided with a circumferential series of chucks 2, arranged in spoke-fashion and angularly equidistanced, which chucks 2 are destined to bear an object 100 coaxially.

In particular, each chuck 2 is provided with a respective motor 3 which sets the chuck 2 in rotation about an axis thereof, in order that it can cooperate, in the various work stations, with the printing of the relative object 100.

The rotatable carousel 200 is rotated intermittently at a constant angular step which is equal to the step which separates the chucks 2, so that each work station is cyclically occupied, for a certain time interval, by an object 100 coming from the preceding work station.

The devices that operate in the various work stations are in themselves of known type, and are therefore not described in the present description.

At the end of the printing stages, the rotatable carousel 200 locates each printed object 100 at an extractor work station 1, as illustrated in FIG. 1.

A transfer organ, denoted in its entirely by 4, operates at the extractor station 1; the transfer organ removes the objects 100 cyclically made available by the rotatable carousel 200 and transfers them to special means for distancing, denoted in their entirety by 5.

The means for distancing 5 can be destined to transport the objects 100 towards collection areas or towards other process machines, according to the production cycle in which the printing machine is inserted.

As illustrated in FIG. 1, the transfer organ 4 comprises a mobile carriage 40 which is slidably coupled to a support bed 41 in order to be able to slide in a straight direction A parallel to the axis of the cylindrical object 100 (and the relative chuck 2) which is stationary in the extractor station 1.

The mobile carriage 40 is associated to a motor, of known type, which slides the carriage 40 along the support bed 41 alternatingly, nearing and distancing the carriage 40 to and from the rotatable carousel 200.

A mounting 42 is located on the mobile carriage 40, which mounting 42 comprises a casing 43 on which a rotating shaft 44 is rotatably coupled, a rotation axis B of which is parallel to the sliding direction A of the carriage 40, (and therefore to the axis of the cylindrical object 100 which is waiting in the extractor station, as well as to the relative chuck 2).

A bar 45 is keyed on the end of the rotating shaft 44 facing the rotating carousel 200; two distinct gripping elements 46 are fixed onto the two ends of the bar 45.

In particular, the gripping elements 46 are symmetrically arranged at diametrically opposite sides of the rotation axis B, about which they perform a revolving motion with a circular trajectory, remaining solidly connected to one another.

Each gripping element 46 preferably comprises a jaw device 47 facing towards the rotatable carousel 200, which jaw device 47 will be neared to an end of the object 100, in order to grip the object 100 and hold it solidly.

A motor 48 is located on the mobile carriage 40, which motor 48, owing to a special transmission system 49, rotates the rotating shaft 44 in controlled steps, and with the shaft 44 also the support body 45 and the gripping elements 46.

In greater detail, the rotating shaft 44 is rotated discontinuously in a predetermined direction C (clockwise in FIG. 5) in a constant step of 180°. The gripping elements 46 thus in turn occupy a gripping position, in which they are coaxially aligned to the object 100 made available by the rotating carousel 200, and a release position, in which they face the means for distancing 5.

The means for distancing 5 comprise a plurality of identical collecting organs, each of which receives and holds a respective object 100.

In the illustrated example, each collecting organ comprises a pin 51 which develops parallel to the sliding direction A of the transfer organ 4, and onto which the respective object 100 is slid.

Figure 2:
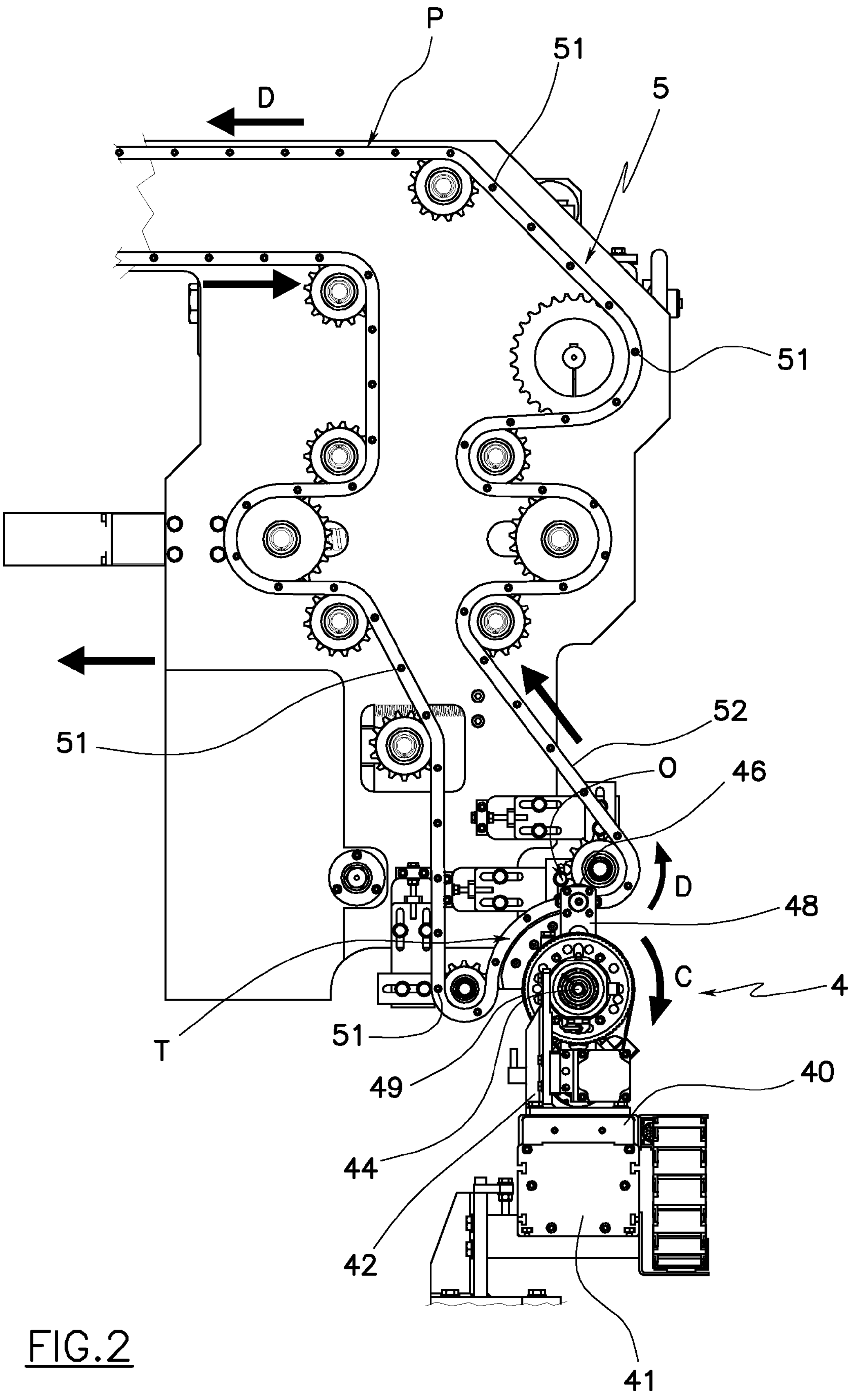
FIG. 2 is a back view of the device of FIG. 1.
Figure 3:
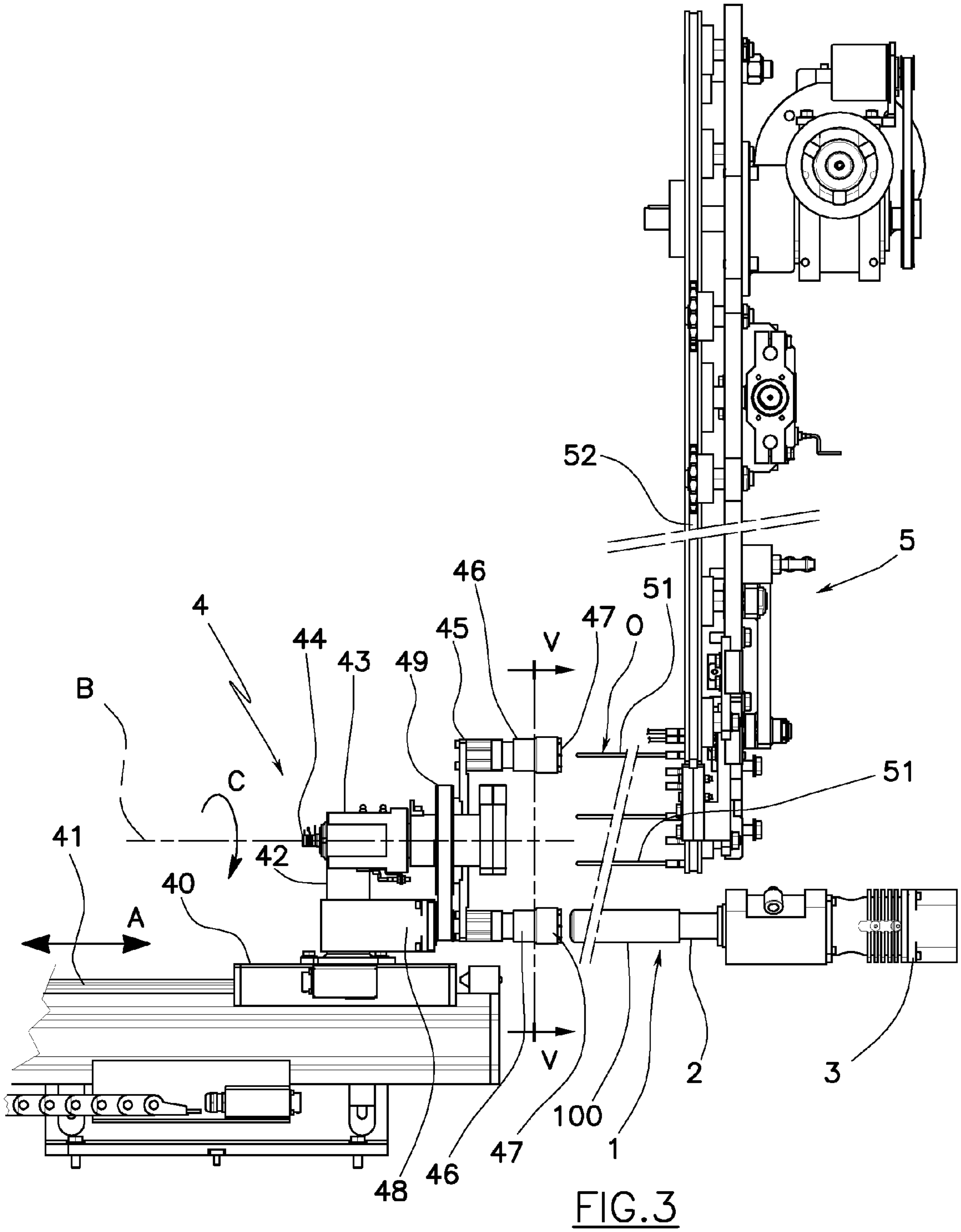
FIG. 3 is a side view of the device of FIG. 1.
Figure 4:
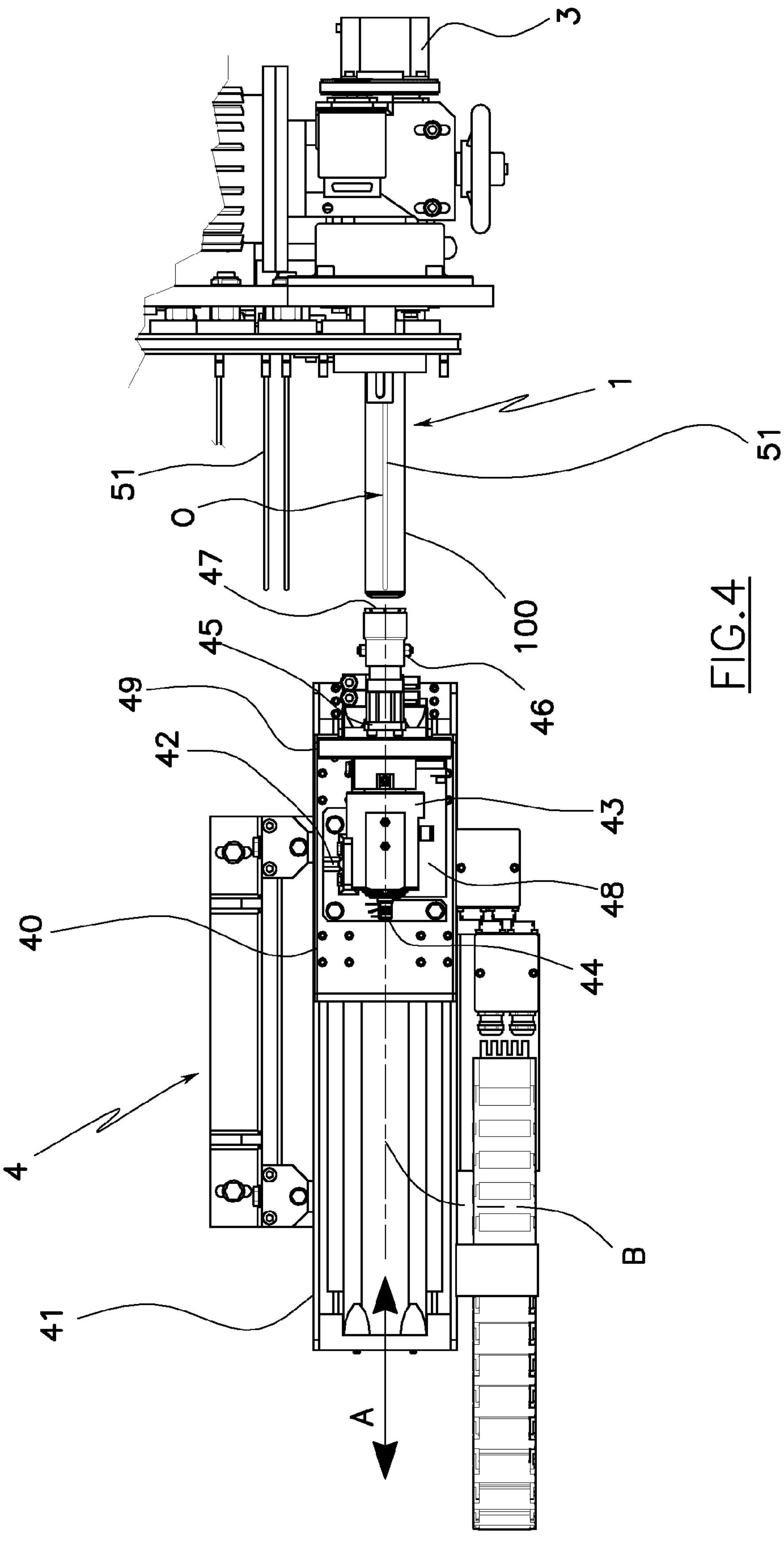
FIG. 4 is a plan view of the device of FIG. 1.

The pins 51 are associated to means for activating which move the pins 51 along a predetermined path P (see FIG. 2).

In particular, the means for activating comprise a flexible chain 52, on which the pins 51 are fixed equidistantly.

The flexible chain 52 lies in a perpendicular plane to the advancement direction A of the transfer organ 4, and is wound about a plurality of transmission wheels which define the above-mentioned path P.

The flexible chain 52 also runs intermittently, in a predetermined direction D, at a constant step which is equal to the distance separating the pins 51.

In this way, the pins 51 rest, for a certain time, in a succession of predetermined positions, among which a receiving position O, in which they are coaxially aligned with the gripping element 46 located in the release position.

Upstream of the receiving position O, the path P comprises a receiving tract T conformed in an arc of circumference, a centre of which is located along the rotation axis B of the gripping elements 46, and a radius of which is equal to the distance separating each of the gripping elements 46 from the rotation axis B.

Figure 5:
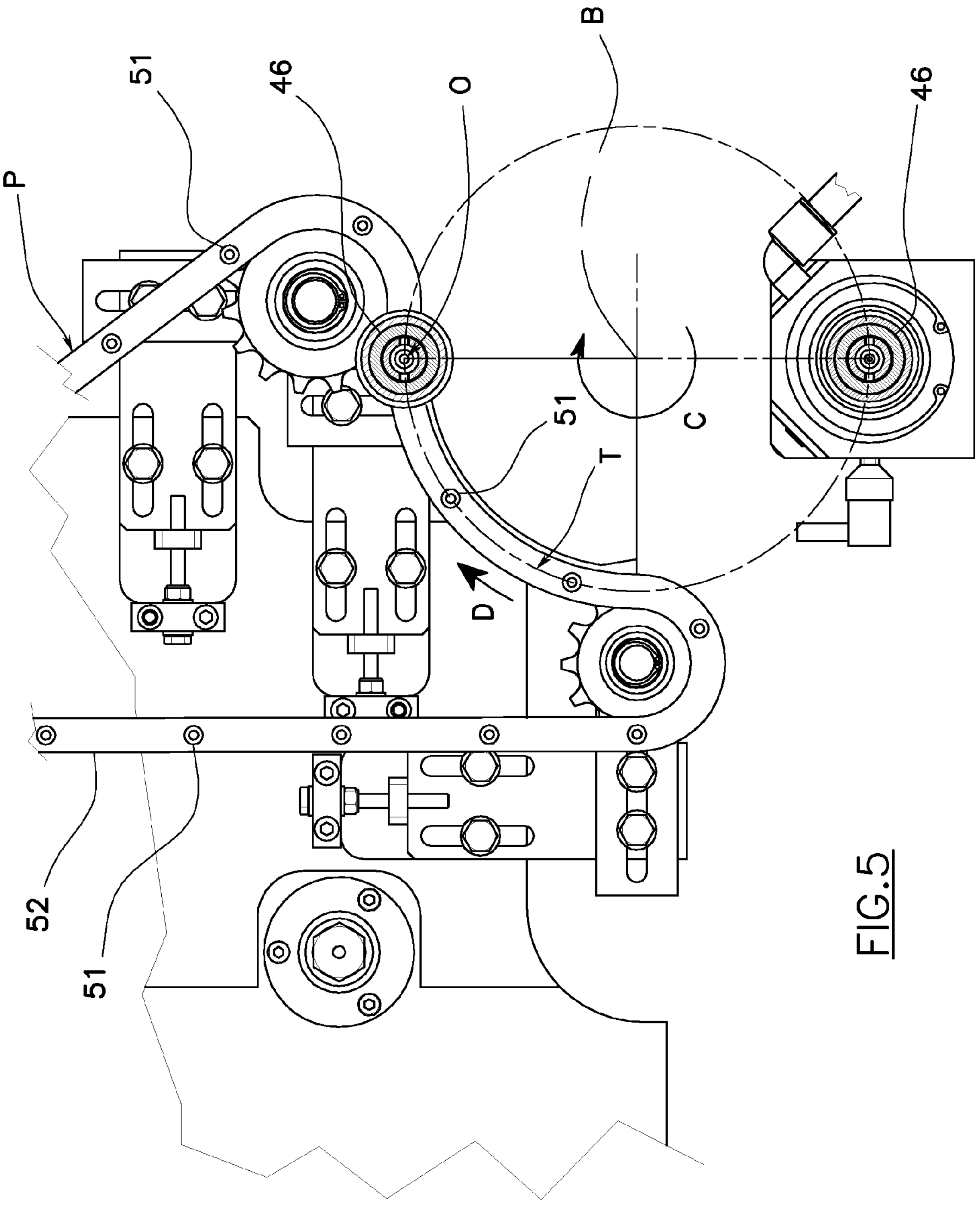
FIG. 5 is a section made along line V-V of FIG. 3.

FIG. 5 shows how in this way the receiving tract T coincides perfectly with the projection, in a perpendicular plane to the advancement direction A of the mobile carriage 40, of a tract of the trajectory described by the gripping elements 46, when the gripping elements 46 rotate about the common rotation axis B thereof.

In more detail, the receiving tract T coincides with the projection, in a perpendicular plane to the advancement direction A of the mobile carriage 40, of the terminal tract of the trajectory described by the gripping element 46 which rotates between the gripping position and the release position.

Further, the sliding direction D of the flexible chain 52 is chosen so that the pins 51 can run along the receiving tract T in the same direction C as the gripping elements 46.

The length of the receiving tract T is preferably greater than the distance separating each pin 51 from the adjacent pins, and makes a subtended angle of about 90°.

In use, the rotatable carousel 200 cyclically makes available a printed object 100 at the extractor station 1.

The gripping organ 4 is at the end-run position of the advancement thereof, with a first gripping element 46 in the gripping position and a second gripping element 46 in the release position.

The first gripping element 46 grips and solidly holds the end of the object 100.

Then the transfer organ 4 makes a backward run, completely extracting the object 100 from the chuck 2.

At this instant, the first and second gripping elements 46 are made to rotate about the common rotation axis B thereof by the shaft 44, in order to invert the relative positions thereof.

When the first gripping element 46 is in the coaxial position with the pin 51 occupying the position immediately upstream of the receiving position O, the flexible chain 52 starts to move at the same speed as the gripping elements 46.

In this way, the pin 51 follows the final part of the receiving tract T of the path P, staying constantly coaxial with the first gripping element 46 and thus with the object 100 received.

During this stage, the transfer organ 4 completes the forward run towards the rotatable carousel 200, and inserts the object 100 on the pin 51 while they are coaxial.

In more detail, the rotation of the gripping elements 46 begins substantially at the same instant in which the transfer organ 4 starts its own forward run. During a first tract of the run, the motor 48 makes the gripping elements 46 rotate quite rapidly, up until the gripping element 46 which has gripped the object 100 is coaxial to the pin 51 which is in the position upstream of the receiving position O.

This is so that the object 100 borne by the gripping element 46 does not interfere with the other pins 51 which are situated along the receiving tract T of the path P.

From this moment on, the rotation of the gripping elements 46 continues at a controlled velocity which is equal to the rotation velocity of the shaft 44, simultaneously with the advancement of the pins 51, so that the transfer organ 4 can precisely insert the object 100 on the pin 51, as it completes the final tract of the forward run thereof.

The movement of the flexible chain 52 and the gripping elements 46 stops when, simultaneously, the pin 51 reaches the receiving position O, the first gripping element 46 reaches the release position, and the second gripping element 46 consequently reaches the gripping position.

At this point, the first gripping element 46 releases the object 100, which remains solidly associated to the pin 51, while at the same time the second gripping element 46 grips a new object 100 made available by the rotatable carousel 200 which, in the meantime, has completed a rotation of one step, and the cycle is repeated.

The invention claimed is:

1. A device for transferring objects (100) from a printing machine chuck (2) to a support and distancing pin (51), wherein the chuck (2) and the pin (51) being moved on two independent paths, each path having a point in which said in (51) and said chuck (2) are parallel to one another and at a predetermined reciprocal distance, the device comprising:

a carriage (40) which is mobile in a parallel direction to the chuck (2) and to the pin (51), between a distant position from the chuck (2) and the pin (51) to a close position to the chuck (2) and the pin (51), means for gripping and releasing the objects (100) being provided on the carriage (40), which means for gripping and releasing (46) are mobile along a predetermined path in order to be placed alternatively in front of the chuck (2) and the pin (51), and wherein projections of the path of movement of the means for gripping and releasing (46) and of the path of movement of the pins (51), in a plane perpendicular to a movement direction (A) of the carriage (40), coincide along at least a portion thereof.

2. The device of claim 1, wherein two means for gripping and releasing (46) are located on the carriage (40), which means (46) are constrained at ends of a bar (45) which is centrally supported by a shaft (44) which is parallel to the movement direction (A) of the carriage (40), which shaft (44) is connected to actuator means (48) which rotate the shaft (44) in controlled steps.

3. The device of claim 2, wherein a distance between the two means for gripping and releasing (46) is equal to a distance between the chuck (2) and the pin (51) when parallel thereto.

4. The device of claim 3, wherein for each rotation by half a full revolution of the shaft (44) one of the two means for gripping and releasing (46) is positioned respectively in front of the pin (51) and another of the two means for gripping and releasing (46) is positioned in front of a chuck (2).

5. The device of claim 3, wherein the path of the pins (51), which coincides with the projection of the trajectory of the means for gripping and releasing (46) in the perpendicular plane to the movement direction (A) of the carriage (40), is a circular path.

6. The device of claim 1, wherein each of the means for gripping and releasing (46) comprises a jaw device (47) able to grip and hold an object (100).

7. The device of claim 1, wherein the pins (51) are moved in the path thereof by a sliding chain (52) to which the pins (51) are fixed.

8. The device of claim 1, wherein the chucks (2) are moved along the path thereof by a rotatable carousel (200) which rotates in controlled steps.

* * * * *